(12) United States Patent
Sakurai (10) Patent No.: US 8,650,443 B2
(45) Date of Patent: Feb. 11, 2014

(54) MANAGEMENT APPARATUS AND METHOD FOR MANAGING A STARTUP OF AN OPERATING SYSTEM

(75) Inventor: Akiko Sakurai, Kanagawa-ken (JP)

(73) Assignee: Kabushiki Kaisha Toshiba, Tokyo (JP)

(*) Notice: Subject to any disclaimer, the term of this patent is extended or adjusted under 35 U.S.C. 154(b) by 511 days.

(21) Appl. No.: 13/048,206

(22) Filed: Mar. 15, 2011

(65) Prior Publication Data

US 2012/0060063 A1 Mar. 8, 2012

(30) Foreign Application Priority Data

Sep. 7, 2010 (JP) ................................ P2010-199631

(51) Int. Cl.
*G06F 11/00* (2006.01)
(52) U.S. Cl.
USPC ............................................................ 714/36
(58) Field of Classification Search
USPC ...................... 714/36; 709/222, 220; 713/2
See application file for complete search history.

(56) References Cited

U.S. PATENT DOCUMENTS

| 6,202,091 | B1 * | 3/2001 | Godse ............................ 709/222 |
| 6,915,417 | B2 * | 7/2005 | Stein et al. ......................... 713/1 |
| 7,174,446 | B2 * | 2/2007 | Dennis et al. ...................... 713/1 |
| 7,395,422 | B2 * | 7/2008 | Norton ............................. 713/2 |
| 7,500,091 | B2 * | 3/2009 | Ergan et al. ....................... 713/1 |
| 7,577,728 | B2 * | 8/2009 | Nakajima et al. ............. 709/221 |
| 7,917,804 | B2 * | 3/2011 | Barlow et al. ................... 714/10 |
| 8,060,760 | B2 * | 11/2011 | Shetty et al. .................. 713/300 |
| 8,352,720 | B2 * | 1/2013 | Hatasaki et al. .................. 713/2 |
| 8,353,046 | B2 * | 1/2013 | Raciborski ...................... 726/26 |
| 8,370,613 | B1 * | 2/2013 | Manadhata et al. ............. 713/2 |
| 2008/0034349 | A1 * | 2/2008 | Biswas et al. ................. 717/121 |

FOREIGN PATENT DOCUMENTS

JP 2001-109635 4/2001

OTHER PUBLICATIONS www.chameleon-managers.com/windows-startup-manager/demo/demo.htm.*
dottech.org/11243/review-chameleon-startup-manager/.*

* cited by examiner

*Primary Examiner* — Amine Riad
(74) *Attorney, Agent, or Firm* — White & Case LLP (57) ABSTRACT

According to an embodiment, a management apparatus includes a management table, a control unit, a module timer, and a judgment unit. The control unit controls an order of executing modules based on an execution order described in a management table. The module timer measures the execution time of each running module. The judgment unit writes real execution time in the management table when the real execution time at the end of the exertion is equal to or shorter than the expected execution time. Otherwise, the judgment unit writes a flag for defective condition in the management table when the real execution time is longer than the expected execution time. When a flag for defective condition is written in the management table, the control unit stops the execution of the running module and starts the execution of the next module.

15 Claims, 9 Drawing Sheets

| MODULE NAME | entry | return | EXPECTED EXECUTION TIME | REAL EXECUTION TIME |
|---|---|---|---|---|
| MODULE 1 | 0x800008a0 | 0xbfc080a4 | 50 | 20 |
| MODULE 2 | 0x80007000 | 0xbfc080b0 | 10 | 7 |
| MODULE 3 | 0x8000b0b0 | 0xbfc080ca | 2 | 1 |
| MODULE 4 | 0x8000f0ee | 0xbfc080ca | 3 | 0 ← FLAG FOR DEFECTIVE CONDITION |
| ... | ... | ... | ... | ... |
| MODULE n | 0x8000d00a | 0xbfc080a0 | 20 | N |

FIG. 9 ves in this way, a failure occurring during the startup of an operating system (OS) can be appropriately handled.

MANAGEMENT APPARATUS AND METHOD FOR MANAGING A STARTUP OF AN OPERATING SYSTEM

CROSS REFERENCE TO RELATED APPLICATION

This application is based upon and claims the benefit of priority from the prior Japanese Patent Application No. 2010-199631, filed on Sep. 7, 2010, the entire contents of which are incorporated herein by reference.

FIELD

The embodiments described hereinbelow relate to a management apparatus and a method for managing a startup of an operating system.

BACKGROUND

Modularization is one of methods of creating operating systems (OS) for computers. Modularized operating systems (OS) can be optimally customized and created to suit individual systems by properly combining modules prepared in advance.

The modularized operating system (OS) has one of the problems that an entire system hangs up when a failure occurs in one of the modules during system operation. To address this problem, there has been proposed so far a failure handling method by providing an operating system with a failure detecting process of detecting a failure that occurs during the operation of a function. In this method, when a failure appears during the operation of a function, the operating system detects the failure, then falls back to the state immediately before the use of the failed function by aborting the failed function, and then continuously performs operation.

The above-described failure handling method is effective only after the startup of the operating system (OS) is completed, and therefore cannot deal with a failure in a case where the operating system (OS) fails to start up, for example, a case where the CPU goes into a hung-up state or the like due to a failure that occurs during the startup of the operating system (OS).

DETAILED DESCRIPTION

According to an embodiment, a management apparatus manages the startup of an operating system. The management apparatus includes a control unit, a measurement unit, and a judgment unit. The control unit controls an order of executing modules in accordance with an execution order described in a management table. The measurement unit measures the execution time of each running module. The judgment unit writes real execution time in the management table when the real execution time at the end of the exertion is equal to or shorter than the expected execution time. Otherwise, the judgment unit writes a flag for defective condition in the management table when the real execution time is longer than the expected execution time. When a flag for defective condition is written in the management table, the control unit stops the execution of the running module and starts the execution of the next module.

According to another embodiment, a method for managing the startup of an operating system has first to fourth steps. In the first step, an execution of a module is started based on an execution order of modules composing of an operating system and expected execution time for each module, the execution order of modules describing in a management table is contained description of a real execution time for each module. In the second step, a measurement of an execution of each running module is started. In the third step, it is judged that the execution of the module is completed successfully and the real execution time in the management table is written when the real execution time at the end of execution is equal to or shorter than the expected execution time, it is judged that a failure occurs during the execution of the module and a flag for defective condition in the management table is written when the execution is not completed even after the real execution time exceeds the expected execution time. In the fourth step, the execution of the running module is stopped and the execution of a next module is started when the flag for defective condition is written for the module in the management table.

Description of other embodiments will be described below with reference to the drawings. In the drawings, the same reference numerals represent the same or similar portions.

Figure 1:
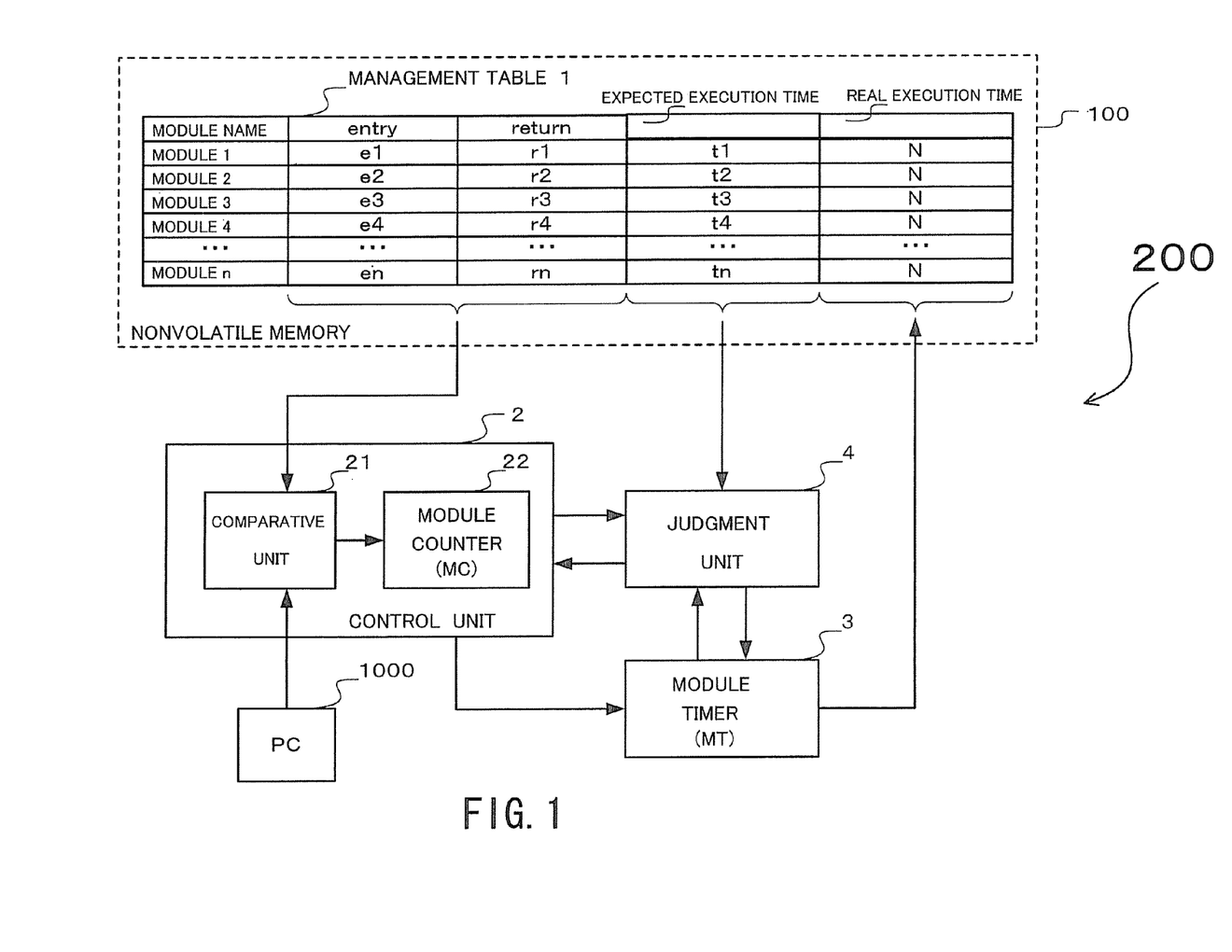
FIG. 1 is a block diagram illustrating a configuration example of a management apparatus according to a first embodiment.

A management apparatus and a management method according to a first embodiment will be described. FIG. 1 is a block diagram illustrating a configuration example of a management apparatus.

As FIG. 1 shows, a management apparatus 200 includes a management table 1, a control unit 2, a module timer (MT) 3, and a judgment unit 4. The management apparatus 200 manages the startup of an operating system (OS). The management table 1 includes descriptions such as the execution order of the modules constituting the operating system (OS), the expected execution time for each module, and the real execution time for each module. The control unit 2 controls the execution order of the modules in accordance with the execution order described in the management table 1. The module timer (MT) 3, which serves as a measurement unit, measures the execution time of the running module. When the real execution time measured by the module timer 3 after the execution of each module is equal to or shorter than the corresponding expected execution time, the judgment unit 4 judges that the execution of the module is completed successfully, and writes the measured real execution time in the management table 1. Also, when the execution is not yet completed even after the execution time measured by the module timer 3 exceeds the expected execution time, the judgment unit 4 judges that a failure occurs in the execution of the module, and writes a flag for defective condition in the management table 1.

When a flag for defective condition is written in the management table 1, the control unit 2 stops the execution of the running module and starts the execution of the next module.

In the first embodiment, the management table 1 is stored in a nonvolatile memory 100. Accordingly, even if the power supply to the management apparatus 200 is cut off, the management table 1 keeps the data that have been written in the management table 1.

The management table 1 includes descriptions of module names, in accordance with the execution order of the modules constituting the operating system. In the example shown in FIG. 1, n modules—module 1, module 2, ..., module n—are executed in the above-described order.

Each module always contains an entry point and a return point. The processing of each module always starts from the entry point, and the processing always passes through the return point at the end of the execution.

The management table 1 includes descriptions of entry points (entry) e1, e2, ..., en and return points (return) r1, r2, ..., rn of the modules as information to control the execution of the modules.

The management table 1 includes cells for description of the expected execution time and the real execution time of the modules. Each of the cells for the expected execution time is filled with an expected value (allowable value) of the processing time for the corresponding module. Each of the cells for the real execution time is filled with the actual execution time for the corresponding module. Note that each cell for the real execution time has a default value of 'N.'

The control unit 2 includes a comparative unit 21 and a module counter (MC) 22.

The comparative unit 21 compares the values of entry points described in the management table 1 with the values of a program counter (PC) 1000 (PC values). When the comparative unit 21 detects an entry point that coincides with a particular PC value, the control unit 2 starts the execution of the module corresponding to the entry point. In addition, the control unit 2 instructs the module timer 3 to start the measurement of the execution time for the module.

Every time the comparative unit 21 detects the coincidence between a PC value and a value of an entry point, the module counter 22 increments the count value by one, and thus counts the number of modules whose execution has been started. When the count value of the module counter 22 reaches the number of all the modules that have to be executed, the control unit 2 completes the startup of the operating system.

Figure 2:
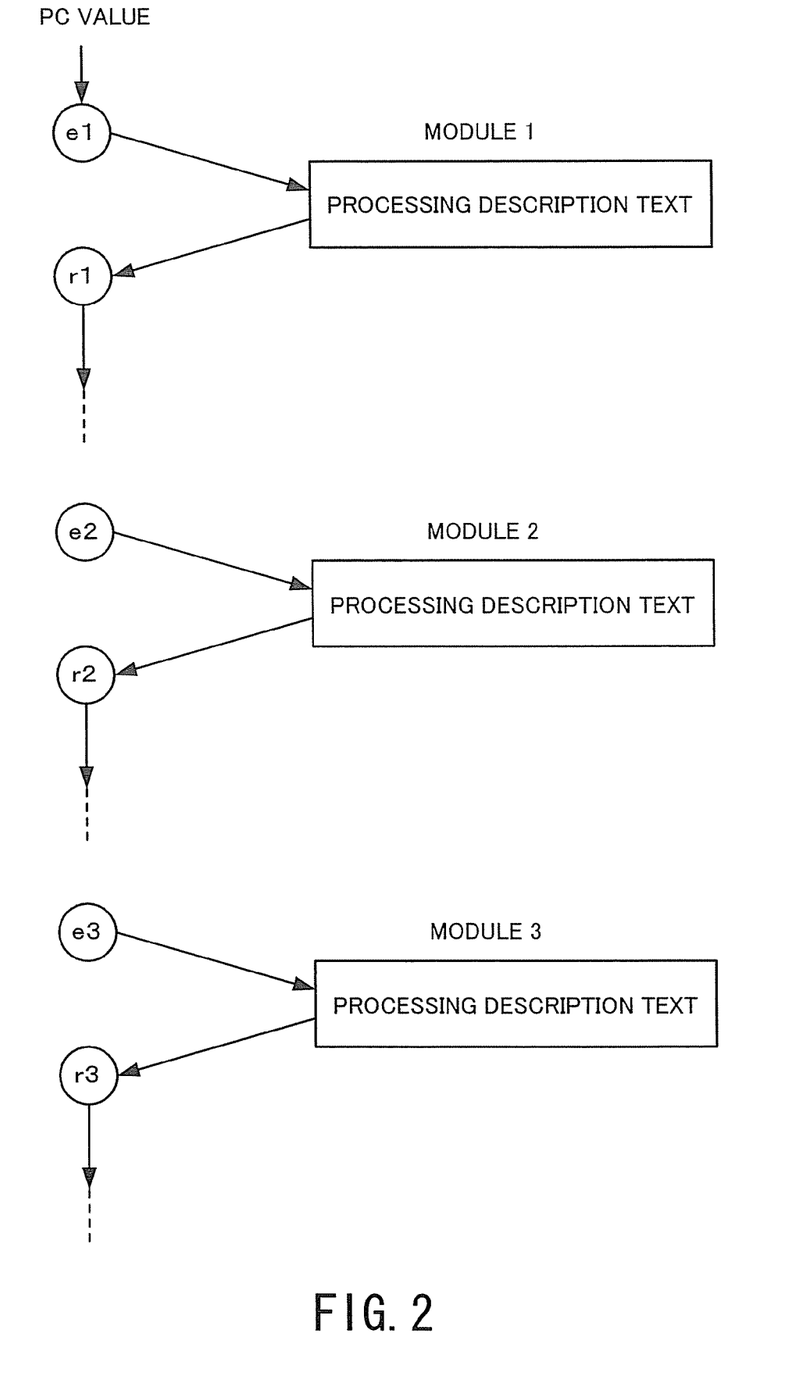
FIG. 2 is a diagram illustrating the relationship among entry points, return points, and execution of the processing of modules.

FIG. 2 shows the relationship among the entry points, the return points, and the execution of the processing of the modules. As FIG. 2 shows, when the PC value coincides with the entry point e1, the text described in the module 1 is executed. Once the execution is completed, the PC value is changed to the return point r1. Likewise, when the PC value coincides with the entry point e2, the module 2 is executed, and when the PC value coincides with the entry point e3, the module 3 is executed.

Upon receiving the instruction from the control unit 2, the module timer 3 executes the measurement of the execution time for each module.

While each module is running, the judgment unit 4 compares, at predetermined temporal intervals, the real execution time measured by the module timer 3 with the expected execution time described in the management table 1. Thus, the judgment unit 4 judges whether the execution of the module is completed successfully or a failure occurs in the execution of the module.

When the real execution time measured by the module timer 3 after the end of the execution of the module is equal to or shorter than the expected execution time, the judgment unit 4 judges that the execution of the module is completed successfully, and writes the real execution time measured by the module timer 3 in the management table 1.

On the other hand, when the execution of the module is not completed by the time when the execution time measured by the module timer 3 exceeds the expected execution time, the judgment unit 4 judges that a failure occurs in the execution of the module, and writes a flag for defective condition in the management table 1. In the first embodiment, a value '0' is written in as the flag for defective condition.

Figure 3:
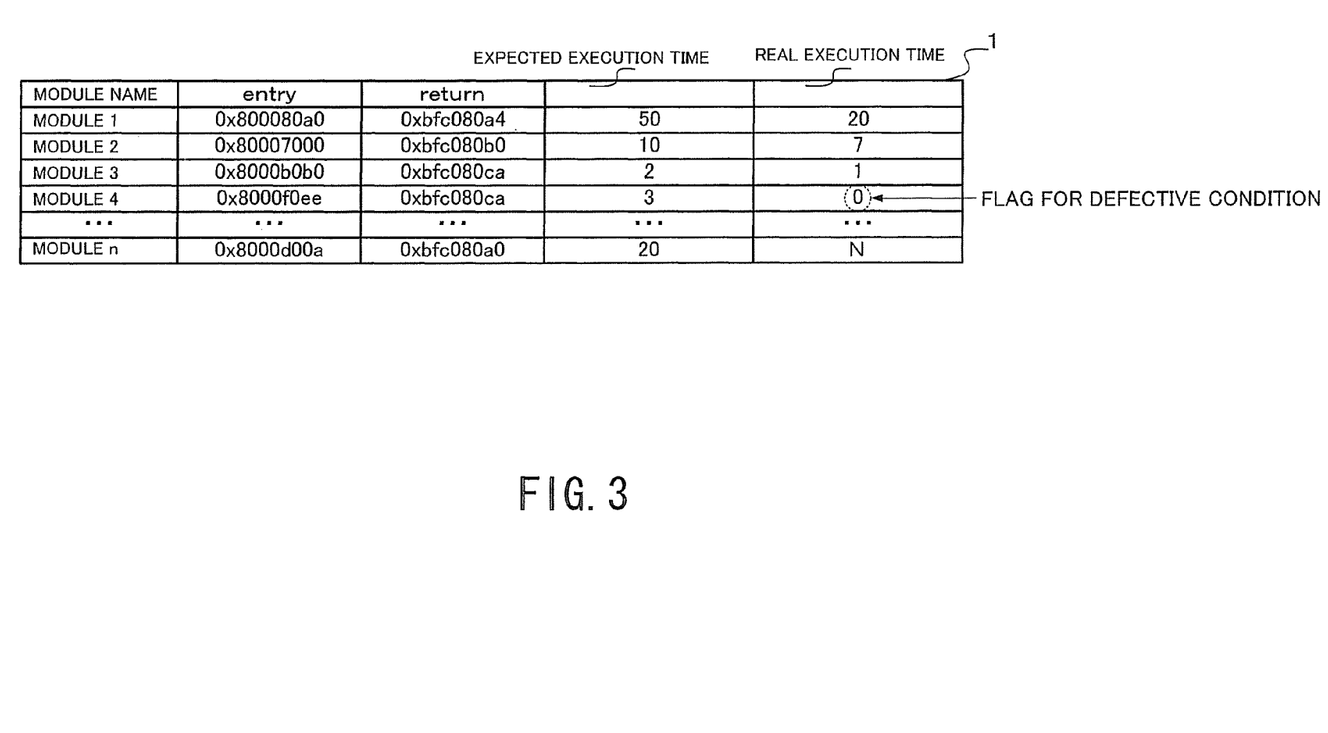
FIG. 3 is a diagram illustrating a writing example of real execution time of the management apparatus according to the first embodiment.

FIG. 3 shows a writing example of real execution time in the management table 1. In the example shown in FIG. 3, the executions of all the modules 1, 2, and 3 are completed within the expected execution time. Accordingly, the real execution time of the modules 1, 2, and 3 is written in the corresponding cell of the real execution time. In contrast, the execution of the module 4 is not completed by the expected execution time. Accordingly, a value '0' is written in the cell of the real execution time as a flag for defective condition.

Next, a sequence of processing to start up the operating system (OS) by the management apparatus of the first embodiment will be described with reference to FIG. 4.

Figure 4:
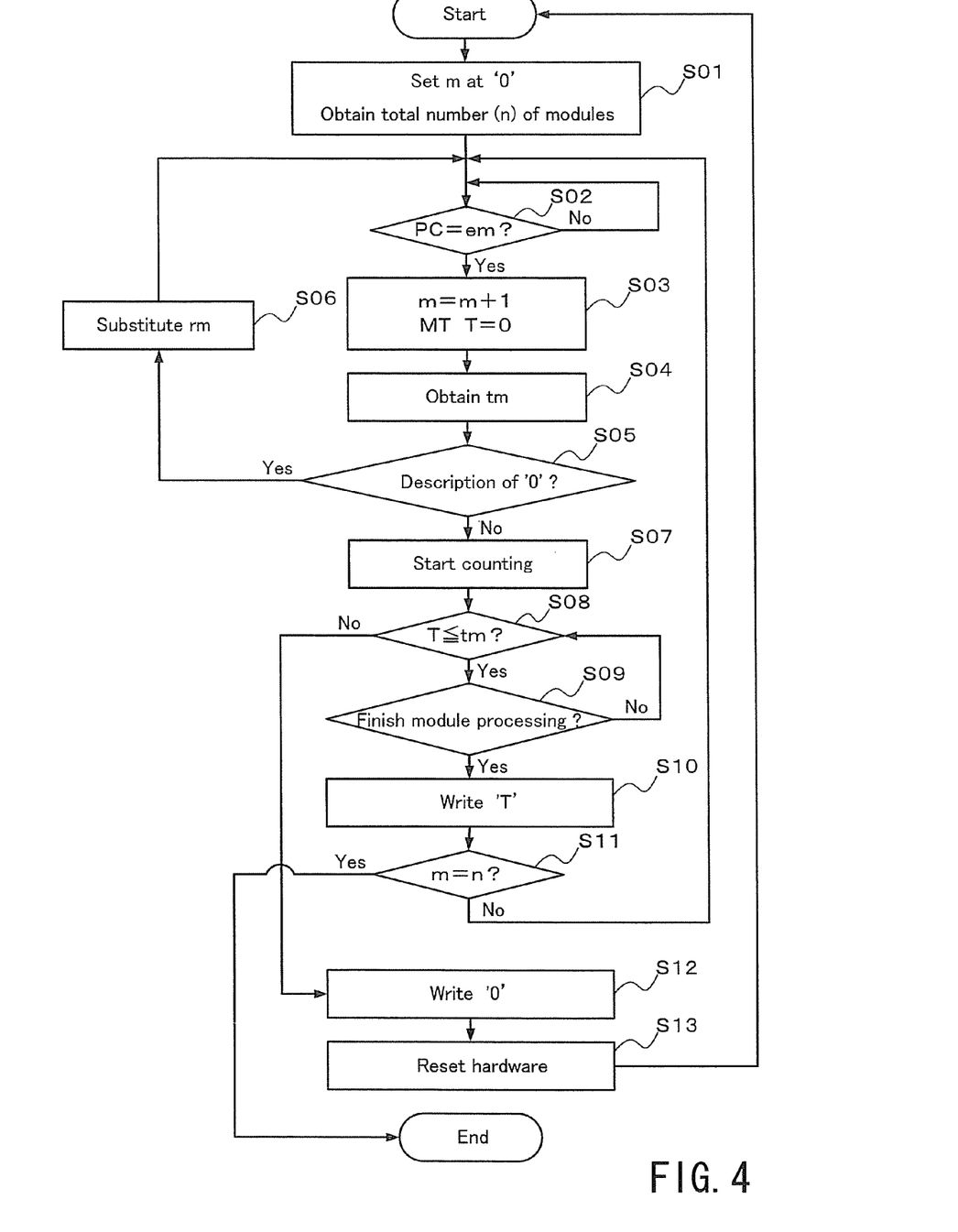
FIG. 4 is a flowchart illustrating the processing flow of the management apparatus according to the first embodiment.

FIG. 4 is a flowchart illustrating the processing flow of the management apparatus according to the first embodiment.

As FIG. 4 shows, when the startup of the operating system (OS) is started, the control unit 2 initializes the module counter (MC) 22, that is, sets the value m of the module counter (MC) at zero (m=0). In addition, the control unit 2 acquires the total number n of the modules from the management table 1 (step S01).

Then, the management apparatus waits until the coincidence between the PC value and the entry point em of the module m (PC=em) is detected by the comparative unit 21 (step S02). When the comparative unit 21 detects the coincidence PC=em (Yes), the module counter 22 increments a count value m by one (i.e., m=m+1). In addition, the module timer (MT) 3 initializes the real execution time T of the module (i.e., T=0) (step S03).

The control unit 2 acquires the expected execution time tm of the module m from the management table 1 (step S04). The control unit 2 checks whether or not the cell of the real execution time in the management table 1 has a value '0' as an execution history (step S05).

When the cell of the real execution time has a value '0' (Yes), a failure is expected to occur during the execution of the module m. Accordingly, the execution of the module m is skipped, and the return point rm of the module m, which is described in the management table 1, is substituted into the program counter (PC) 1000 (step S06). Then, the processing flow returns to step S02.

On the other hand, when the cell of the real execution time has a value other than a value '0' (No), the module timer (MT) 3 starts measuring the real execution time T for the module m upon receiving the instruction from the control unit 2 (step S07).

While measuring the real execution time T, the judgment unit 4 checks at predetermined temporal intervals whether or not the real execution time T is within the expected execution time tm (T≤tm) (step S08).

When If T≤tm (Yes), then the judgment unit 4 checks whether or not the module processing is completed (step S09). When the module processing is completed (Yes), the judgment unit 4 judges that the execution of the module m is completed successfully, and writes the measured real execution time T in the cell of the real execution time corresponding to the module m in the management table 1 (step S10).

Next, the control unit 2 checks whether or not the count value m of the module counter 22 reaches the total number n of the modules (m=n) (step S11). When m=n (Yes), the control unit 2 terminates the startup of the operating system.

Meanwhile, When m≠n (No), the control unit 2 returns to step S02, and stands by to execute the processing of the next module.

On the other hand, in step S08, when the formula T≤tm is not satisfied (No), i.e., the real execution time T exceeds the expected execution time tm, the judgment unit 4 judges that a failure occurs in the execution of the module m. Accordingly, a value '0', the flag for defective condition, is written in the cell of the real execution time for the module m in the management table 1 (step S12).

In the above case, the control unit 2 resets the hardware (step S13), and restarts the operating system (OS).

According to the above-described processing flow, when the real execution time of a particular module exceeds the expected execution time for the module, the management apparatus judges that a failure occurs in the execution of the module, resets the hardware, and restarts the operating system (OS). Accordingly, the occurrence of a failure such as a hung-up of the CPU can be prevented. In addition, after the operating system (OS) is restarted, the execution of the module with a value '0' (i.e., the flag for defective condition) written in the cell of the real execution time in management table 1 is skipped by referring to the cell of the real execution time. Hence, the module having a history with the defective condition is not executed, so that the startup of the operating system (OS) can be completed successfully.

Next, a method of setting the expected execution time of the first embodiment will be described. In the first embodiment, the expected execution time is set either manually or automatically. When the setting is made automatically, the expected execution time is set by referring to a past execution history (i.e., the cells of the real execution time in the management table 1). The method of setting the expected execution time will be described with reference to the flowchart shown in FIG. 5.

Figure 5:
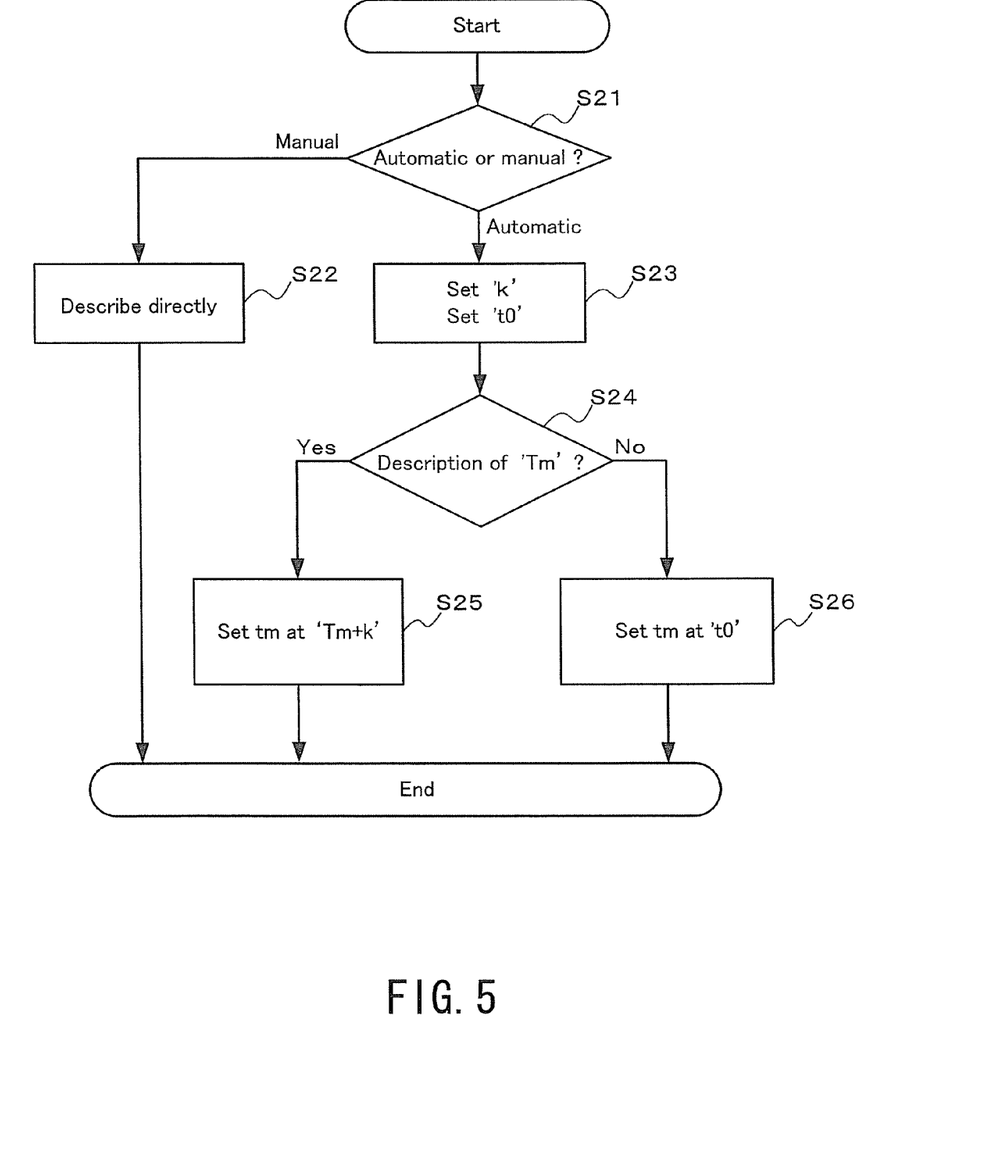
FIG. 5 is a flowchart illustrating an example of a method of setting expected execution time of the management apparatus according to the first embodiment sets.

As FIG. 5 shows, when the setting of the expected execution time is started, whether the setting is made manually or automatically is firstly determined (step S21). When the setting is made manually, expected execution time is written directly in each cell of the expected execution time in the management table 1 (step S22), and thus the setting of the expected execution time is completed.

On the other hand, when the setting is made automatically, both allowable time (the allowable time for exceeding the real execution time) k and a default value (the maximum time expected to be necessary for the execution of the module) t0 are set (step S23).

Next, it is checked whether or not a value of real execution time Tm is written in the cell of the real execution time for the module m in the management table 1 (step S24).

When the cell has a value of real execution time Tm (Yes), the expected execution time tm for the module m is determined by the following formula:

$$tm = Tm + k.$$

Then, the expected execution time tm thus determined is written in the cell of the expected execution time for the module m in the management table 1 (step S25). Thus, the setting of the expected execution time is completed.

On the other hand, when no value of real execution time Tm is written in the cell of the real execution time for the module m (No), that is, either a value 'N' or a value '0' is written in the cell, the expected execution time tm is set to satisfy the following formula;

$$tm = t0.$$

Then, the value t0 is written in the cell of the expected execution time for the module m in the management table 1 (step S26). Thus, the setting of the expected execution time is completed.

As described above, when a failure occurs in a module at the time of starting up the operating system (OS), the management apparatus according to the first embodiment restarts the operating system (OS), and successfully completes the startup of the operating system (OS) by skipping the execution of the module having the failure.

A management apparatus and a management method according to a second embodiment will be described. In the first embodiment, when a failure occurs in an execution of a module, the operating system (OS) is restarted. Alternatively, the second embodiment will show an example of the management apparatus which does not have to restart the operating system (OS).

Figure 6:
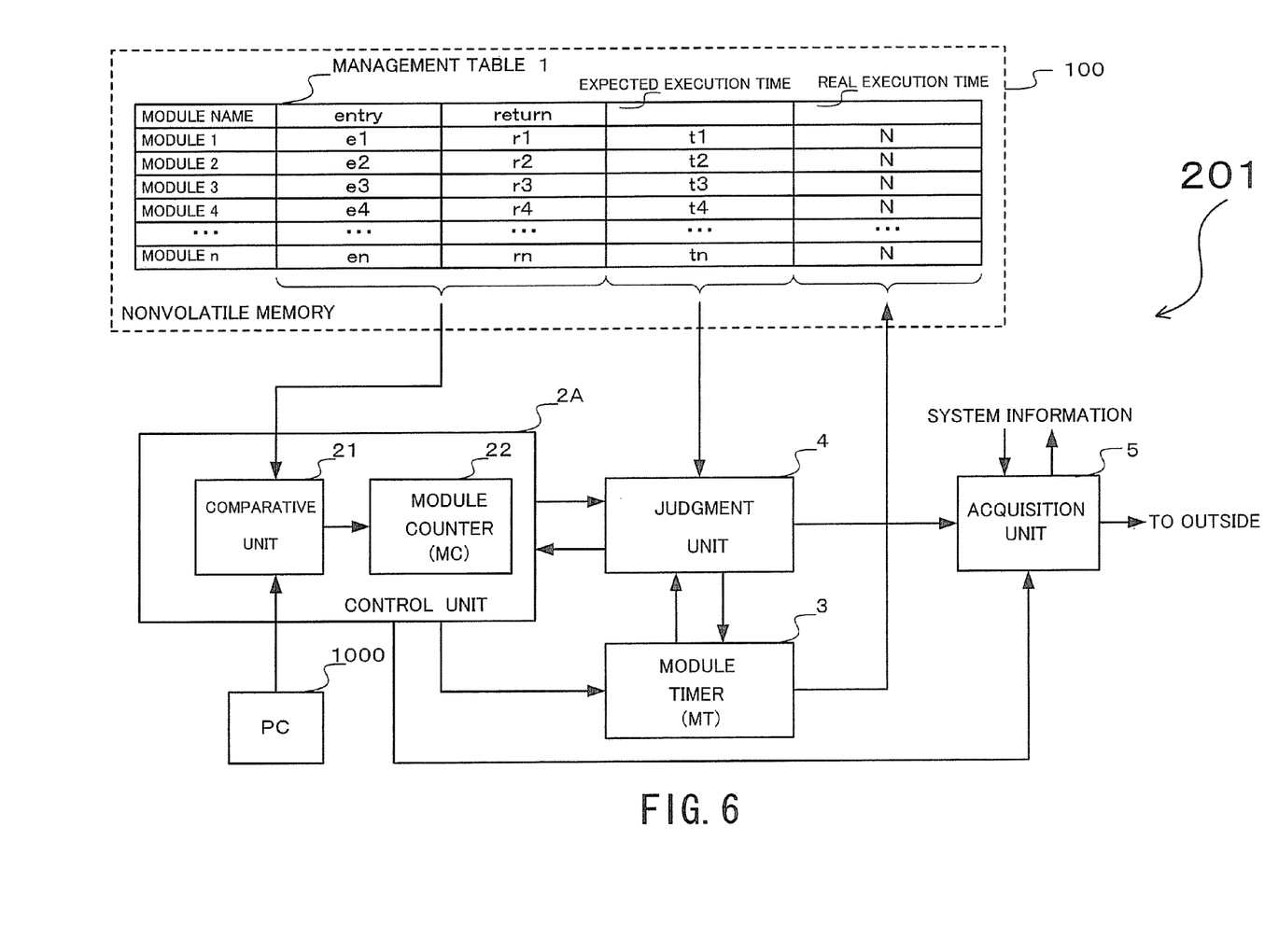
FIG. 6 is a block diagram illustrating a configuration example of a management apparatus according to a second embodiment.

FIG. 6 is a block diagram illustrating a configuration example of the management apparatus. A management apparatus 201 of the second embodiment is a management apparatus obtained by adding an acquisition unit 5 to the management apparatus 200 of the first embodiment shown in FIG. 1. Hence, blocks having functions the same or equivalent to those blocks shown in FIG. 1 are denoted by the same or similar reference numerals in FIG. 1, and the detailed description will be omitted here.

As FIG. 6 shows, the acquisition unit 5 acquires and stores the system information at every time point when the control unit 2 makes a judgment concerning the execution of the modules. The system information thus acquired includes the PC value, the value of a register, the value of a status register, the value of a main memory and the like.

Every time the execution of a module is completed successfully, the acquisition unit 5 updates the content of the system information. Accordingly, the acquisition unit 5 holds the latest system information at the time point when the execution of a module is completed successfully (the normal condition system information).

In contrast, when a failure occurs during execution of a module, all the system information at the time point of failure occurrence (defective condition system information) is acquired and stored by the acquisition unit 5. In the above event, a judgment unit 4 writes a value '0' (i.e., flag for defective condition) in the cell of the real execution time for the failed module in a management table 1.

The acquisition unit 5 is capable of outputting defective condition system information to the outside. Hence, after the startup of the operating system (OS) is completed successfully, the defective condition system information is analyzed to investigate a cause for the occurrence of the failure during the execution of the module.

In the second embodiment, if a value '0' (i.e., the flag for defective condition) is written in the management table 1, a control unit 2A restores the system to the state described in the normal condition system information stored by the acquisition unit 5, and starts the execution of the next module.

Figure 7:
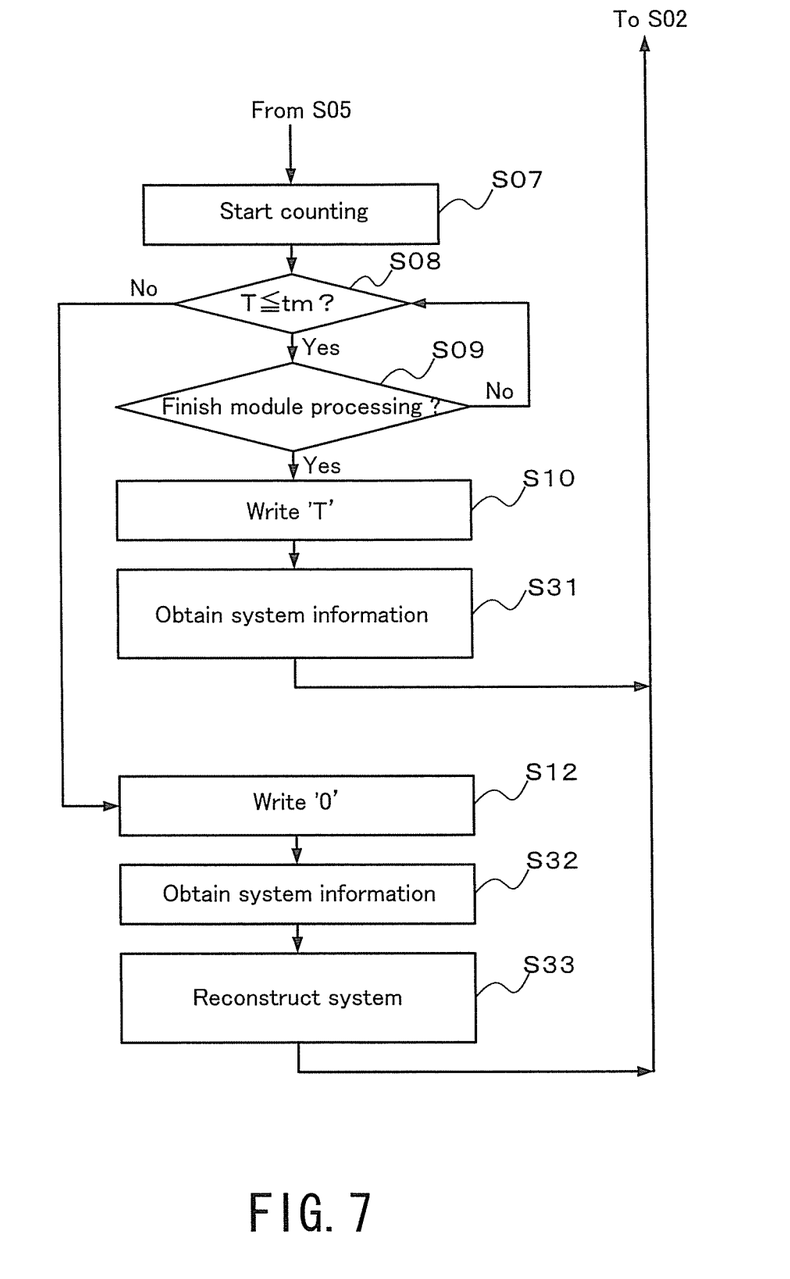
FIG. 7 is a flowchart illustrating the processing flow of the management apparatus according to the second embodiment.

FIG. 7 is a flowchart illustrating the processing flow of the management apparatus according to the second embodiment. The basic processing flow of the management apparatus of the second embodiment is the same as the one shown in FIG. 4. Hence, processes that are the same as those processes in FIG. 4 are denoted by the same step numbers. The description of the portions of the same flow in FIG. 4 will be omitted, and the description will be given only of portions that relate to the processes peculiar to the second embodiment.

As FIG. 7 shows, after the measurement of the real execution time T for the module m is started (step S07), the judgment unit 4 checks at predetermined temporal intervals whether or not the real execution time T is within the expected execution time tm (T≤tm) (step S08). When T≤tm (Yes), then the judgment unit 4 checks whether or not the module processing is completed (step S09). When the module processing is completed (Yes), the judgment unit 4 writes the measured real execution time T in the cell of the real execution time corresponding to the module m in the management table 1 (step S10).

Here the second embodiment, the acquisition unit 5 acquires and stores the normal condition system information (updates the latest information) (step S31). Then, the processing flow returns to step S02 shown in FIG. 4.

On the other hand, if the formula T≤tm is not satisfied (No), the judgment unit 4 writes a value '0', the flag for defective condition, in the cell of the real execution time for the module m in the management table 1 (step S12).

Here in the second embodiment, the acquisition unit 5 acquires and stores the defective condition system information (step S32).

In the second embodiment, the control unit 2A restores the system to the state described in the normal condition system information stored by the acquisition unit 5 (step S33). Then, the processing flow returns to step S02 shown in FIG. 4.

In the second embodiment, when the processing flow returns to step S02, the system returns to the same state as that of the time when the execution of the module is completed successfully for the last time. Then, the execution of the next module is started.

As described above, when a failure occurs in a module during execution of the module, the management apparatus according to the second embodiment skips the execution of the module. The management apparatus restores the system to the state at the time when the execution of the module is completed successfully for the last time. Then, the execution of the next module can be started. Accordingly, the startup of the operating system can be completed successfully without restarting the operating system. In addition, after the startup of the operating system is completed, the system information of the time of the failure occurrence during the execution of the module can be read out and thereby the cause of the failure can be investigated.

A management apparatus and a management method according to a third embodiment will be described. In the third embodiment, there will be shown an example of the management apparatus which is capable of completing the startup of the operating system within a predetermined startup time.

Figure 8:
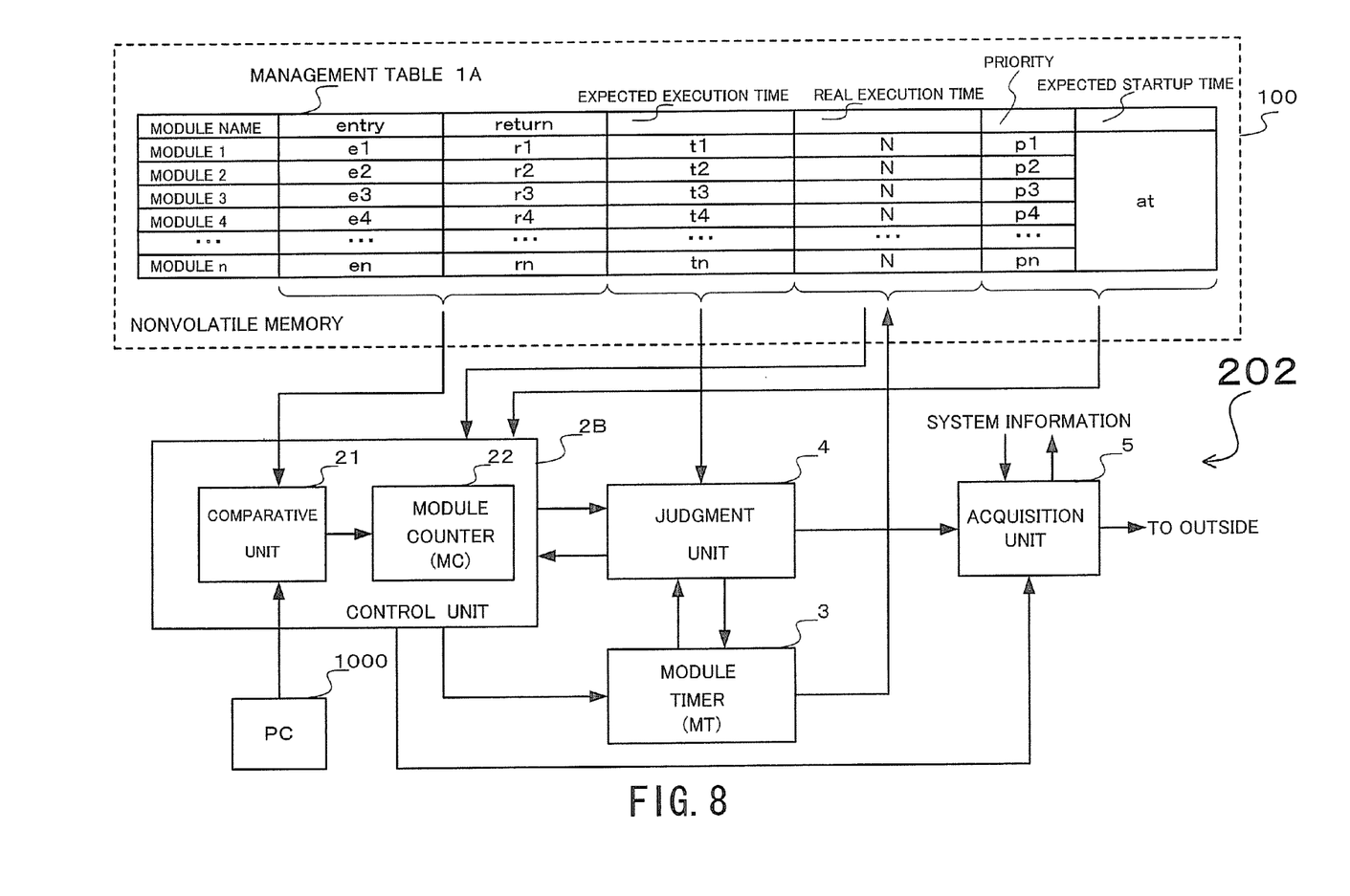
FIG. 8 is a block diagram illustrating a configuration example of a management apparatus according to a third embodiment.

FIG. 8 is a block diagram illustrating a configuration example of a management apparatus according to the third embodiment. A management apparatus 202 of the third embodiment is obtained by changing a management table 1 of a management apparatus 201 of the second embodiment shown in FIG. 6 into a management table 1A and also changing a control unit 2A into a control unit 2B. Note that the management apparatus 202 may be obtained by changing a management apparatus 200 of the first embodiment in a similar manner.

As FIG. 8 shows, the expected startup time at corresponding to the startup of the operating system, and the priorities p1 to pn of the modules are described in the management table 1A in addition to each item described in the management table 1.

When the sum of the real execution time written in the management table 1A exceeds the expected startup time at, the control unit 2B refers to the priorities described in the management table 1A and removes the modules with lower priorities from execution targets until the sum of the real execution time becomes within the expected startup time.

Figure 9:
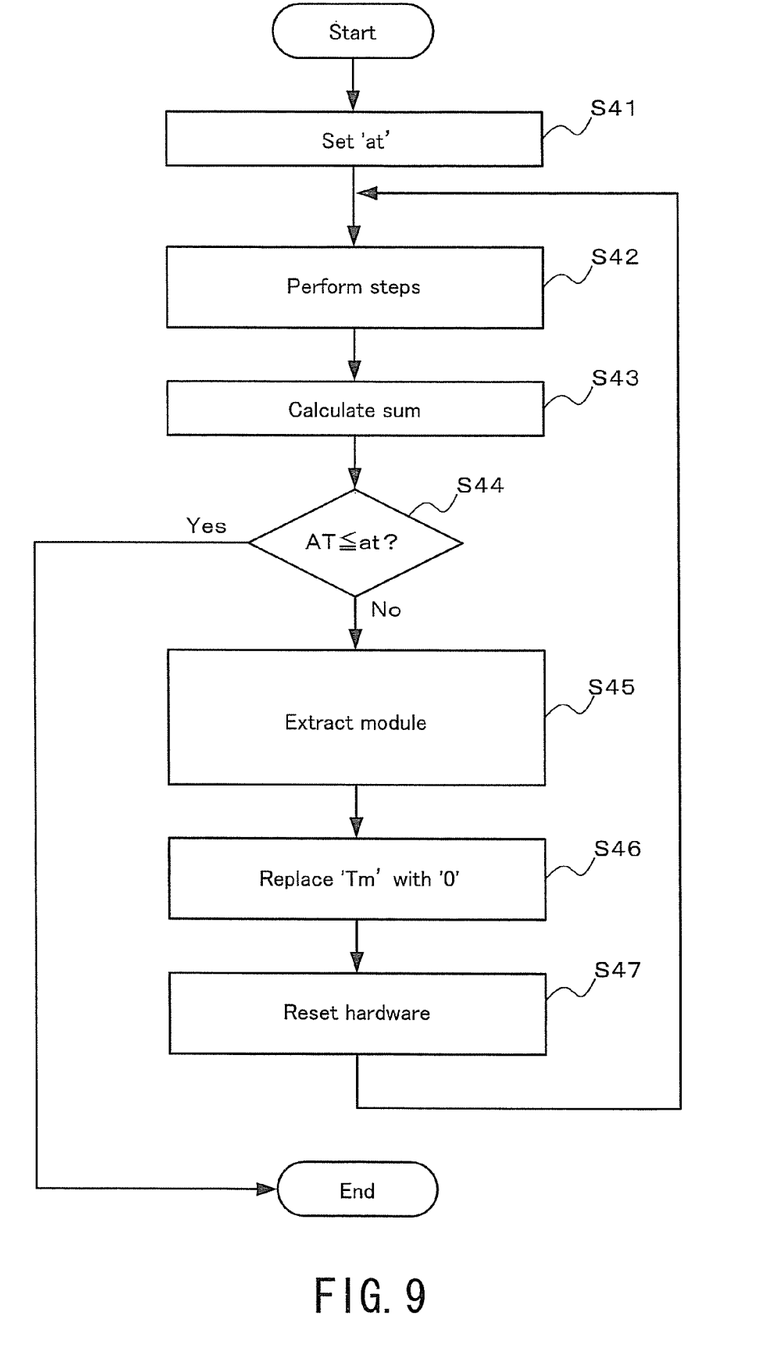
FIG. 9 is a flowchart illustrating the processing flow of the management apparatus according to the third embodiment.

FIG. 9 is a flowchart illustrating the processing flow of the management apparatus according to the third embodiment.

As FIG. 9 shows, when the startup of the operating system (OS) is started, the expected startup time at is set and written in management table 1A together with the priorities p1 to pn of the modules (step S41).

Then, the steps shown in FIG. 7 (or FIG. 3) are executed until immediately before the startup of the operating system (OS) is completed (step S42). Then, the sum AT of the real execution time of the modules written in the management table 1A is calculated (step S43).

Next, it is checked whether or not the sum AT of the real execution time of the modules is within the expected startup time at (AT≤at) (step S44). Here, if AT≤at (Yes), the execution of all the modules is successfully completed within the expected startup time AT. Hence, the startup of the operating system (OS) is completed.

In contrast, if the sum AT of the real execution time of the modules exceeds the expected startup time at (No), a module m which has a positive real execution time Tm (Tm>0) and the lowest execution priority pm is selected. Here, if there are plural modules that have the same priority values, the one with the longest real execution time is selected (step S45).

Then, the real execution time Tm of the selected module m is rewritten to Tm=0 (step S46). With the rewriting as described above, the execution of the module m is skipped from the next startup of operating system (OS).

Finally, the hardware is reset (step S47), and the processing flow returns to step S42. With such a feedback, modules with lower execution priorities are sequentially removed from the execution targets until AT≤at.

As a result, the startup time of the operating system can be eventually reduced within the expected startup time.

As described above, in the management apparatus of the third embodiment, if the sum of the real execution time of the modules exceeds the expected startup time, it is possible to sequentially remove the modules with the lower priorities from the execution targets. Thus, the operating system (OS) including the modules with higher priorities can be started within a predetermined startup time.

According to at least one of the management apparatuses of the above-described embodiments, even if a failure occurs during the execution of the module at the time of the startup, the startup of the operating system (OS) can be completed successfully.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management apparatus for managing a startup of an operating system, comprising:
    a management table containing description of an execution order of modules constituting an operating system, expected execution time for each module, and real execution time for each module;
    a control unit to control an order of executing the modules based on the execution order described in the management table;
    a measurement unit to measure the execution time of each running module; and
    a judgment unit to judge that the execution of the module is completed successfully and to write the real execution time in the management table when the real execution time at the end of execution is equal to or shorter than the expected execution time, the judgment unit to judge that a failure occurs during the execution of the module and to write a flag for defective condition in the management table when the execution is not completed even after the real execution time exceeds the expected execution time, wherein
    when the flag for defective condition is written for the module in the management table, the control unit stops the execution of the running module and starts the execution of a next module.

2. The management apparatus according to claim 1, wherein
    the control unit includes a comparative unit and a module counter,
    the comparative unit compares values of entry points described in the management table with values of a program counter, and
    the module counter counts the number of modules whose execution is started every time the comparative unit detects a coincidence between the value of an entry point and the value of the program counter.

3. The management apparatus according to claim 1, wherein
    the management table is stored in a nonvolatile memory.

4. The management apparatus according to claim 1, wherein
    the management table further contains description of expected startup time and a priority of each module, and
    when the sum of the real execution time written in the management table exceeds the expected startup time, the control unit removes the modules from execution targets in ascending order from the module with the lowest priority until the sum of the real execution time becomes equal to or shorter than the expected startup time.

5. The management apparatus according to claim 1, wherein
    the expected execution time is set automatically or manually, and
    the automatic setting of the expected execution time is made by referring to a past execution history described in the management table.

6. A management apparatus for managing a startup of an operating system, comprising:
    a management table containing description of an execution order of modules constituting an operating system, expected execution time for each module, and real execution time for each module;
    a control unit to control an order of executing the modules based on the execution order described in the management table;
    a measurement unit to measure the execution time of each running module;
    a judgment unit to judge that the execution of the module is completed successfully and to write the real execution time in the management table when the real execution time at the end of execution is equal to or shorter than the expected execution time, the judgment unit to judge that a failure occurs during the execution of the module and to write a flag for defective condition in the management table when the execution is not completed even after the real execution time exceeds the expected execution time; and
    an acquisition unit to acquire and store system information at every time point when the judgment unit makes a judgment, wherein
    when the flag for defective condition is written for the module in the management table, the control unit stops the execution of the running module and starts the execution of a next module.

7. The management apparatus according to claim 6, wherein
    the control unit includes a comparative unit and a module counter,
    the comparative unit compares values of entry points described in the management table with values of a program counter, and
    the module counter counts the number of modules whose execution is started every time the comparative unit detects a coincidence between the value of an entry point and the value of the program counter.

8. The management apparatus according to claim 7, wherein
    any one of the value of the program counter, a value of a register, a value of a status register, and a value of a main memory is acquired as the system information.

9. The management apparatus according to claim 6, wherein
    when the flag for defective condition is written in the management table, the control unit restores the operating system to a state described in the system information stored when the execution of the module is completed successfully for the last time, the control unit starts execution of a next module.

10. The management apparatus according to claim 6, wherein
    the acquisition unit outputs the system information to an outside, the system information stored when the module having the flag for defective condition written therefor is executed.

11. The management apparatus according to claim 6, wherein
    the management table is stored in a nonvolatile memory.

12. The management apparatus according to claim 6, wherein
    the management table further contains description of expected startup time and a priority of each module, and
    when the sum of the real execution time written in the management table exceeds the expected startup time, the control unit removes the modules from execution targets in ascending order from the module with the lowest priority until the sum of the real execution time becomes equal to or shorter than the expected startup time.

13. The management apparatus according to claim 6, wherein the expected execution time is set automatically or manually, and the automatic setting of the expected execution time is made by referring to a past execution history described in the management table.

14. A method for managing a startup of an operating system, comprising:

starting an execution of a module based on an execution order of modules composing of an operating system and expected execution time for each module, the execution order of modules describing in a management table containing description of a real execution time for each module;

starting a measurement of an execution of each running module;

judging that the execution of the module is completed successfully and writing the real execution time in the management table when the real execution time at the end of execution is equal to or shorter than the expected execution time, judging that a failure occurs during the execution of the module and writing a flag for defective condition in the management table when the execution is not completed even after the real execution time exceeds the expected execution time; and stopping the execution of the running module and starting the execution of a next module when the flag for defective condition is written for the module in the management table.

15. The method according to claim 14, further comprising:

acquiring and storing system information at every time point when the judgment unit makes a judgment.

* * * * *